US009702358B2

(12) United States Patent
Vezil et al.

(10) Patent No.: US 9,702,358 B2
(45) Date of Patent: Jul. 11, 2017

(54) TEMPERATURE CONTROL FOR COMPRESSOR

(71) Applicant: Ingersoll-Rand Company, Davidson, NC (US)

(72) Inventors: Stefano Vezil, Trieste (IT); Jouko Tapani Peussa, Brussels (BE); Cristiano Lissoni, Inzago (IT)

(73) Assignee: Ingersoll-Rand Company, Davidson, NC (US)

( * ) Notice: Subject to any disclaimer, the term of this patent is extended or adjusted under 35 U.S.C. 154(b) by 504 days.

(21) Appl. No.: 14/213,710

(22) Filed: Mar. 14, 2014

(65) Prior Publication Data

US 2014/0271258 A1    Sep. 18, 2014

Related U.S. Application Data

(60) Provisional application No. 61/802,266, filed on Mar. 15, 2013.

(51) Int. Cl.
*F04B 49/22* (2006.01)
*F04C 23/00* (2006.01)
(Continued)

(52) U.S. Cl.
CPC .......... *F04B 49/22* (2013.01); *B01D 5/0087* (2013.01); *F04C 23/005* (2013.01); *F04C 29/04* (2013.01);
(Continued)

(58) Field of Classification Search
CPC ........ F04B 49/22; F04C 29/04; F04C 23/005; F04C 18/16; F04C 2210/247;
(Continued)

(56) References Cited

U.S. PATENT DOCUMENTS 2,867,376 A * 1/1959 Keir .................. F04C 29/02
184/104.1
3,782,755 A    1/1974 Novak et al.
(Continued)

OTHER PUBLICATIONS

14160294.6, Extended European Search Report, Nov. 3, 2014, 9 pages.

*Primary Examiner* — William H Rodriguez
*Assistant Examiner* — Christopher Brunjes
(74) *Attorney, Agent, or Firm* — Taft Stettinius & Hollister LLP (57) ABSTRACT

According to at least one aspect of the present disclosure, an apparatus for cooling a coolant for a gas compressor includes a compressor to generate a flow of compressed gas, a dryer in fluid communication with the compressor, and a coolant circuit. The coolant circuit includes an accumulator to accumulate the coolant, a pump in fluid communication with the accumulator and the compressor to circulate the coolant through the coolant circuit, a first intercooler in fluid communication with the accumulator and the pump and structured to transfer heat from the coolant circuit to the compressed gas flow via the dryer, and a valve disposed between the accumulator and the first intercooler and structured to route at least a portion of the coolant through the first intercooler depending on a temperature of the coolant relative to prescribed low and high temperature limits.

20 Claims, 4 Drawing Sheets

(51) Int. Cl.
*F04C 29/04* (2006.01)
*F04C 18/16* (2006.01)
*B01D 5/00* (2006.01)

(52) U.S. Cl.
CPC ...... *F04C 18/16* (2013.01); *F04C 2210/1005* (2013.01); *F04C 2210/247* (2013.01); *F04C 2240/81* (2013.01); *F04C 2270/195* (2013.01)

(58) Field of Classification Search
CPC .......... F04C 2210/1005; F04C 2240/81; F04C 2270/195; B01D 5/0087; F25B 1/00; F17C 1/00; F17C 2227/00
See application file for complete search history.

(56) References Cited

U.S. PATENT DOCUMENTS

| | | | |
|---|---|---|---|
| 3,785,755 A * | 1/1974 | Novak | F04C 29/0007 418/85 |
| 3,850,554 A | 11/1974 | Zimmern | |
| 5,087,178 A | 2/1992 | Wells | |
| 5,362,207 A * | 11/1994 | Martin | F04D 25/02 165/140 |
| 5,845,505 A | 12/1998 | Galus et al. | |
| 5,947,711 A | 9/1999 | Myers et al. | |
| 6,102,683 A | 8/2000 | Kirsten | |
| 6,220,245 B1 | 4/2001 | Takabayashi et al. | |
| 6,220,825 B1 | 4/2001 | Myers et al. | |
| 6,287,084 B1 | 9/2001 | Kirsten | |
| 6,302,667 B1 | 10/2001 | Timuska et al. | |
| 6,866,490 B2 | 3/2005 | Daniëls et al. | |
| 7,305,838 B2 | 12/2007 | Fornof | |
| 7,334,428 B2 | 2/2008 | Holdsworth | |
| 7,993,110 B1 * | 8/2011 | Hill | F04C 13/008 210/748.01 |
| 8,007,263 B2 | 8/2011 | Yoshimura et al. | |
| 8,028,536 B2 | 10/2011 | Morgan et al. | |
| 8,246,318 B2 | 8/2012 | Tanaka et al. | |
| 8,262,343 B2 | 9/2012 | Hagen | |
| 2005/0223736 A1 * | 10/2005 | Filipiak | F25B 39/04 62/509 |
| 2005/0271537 A1 * | 12/2005 | Firnhaber | F04C 29/122 418/201.2 |
| 2007/0074535 A1 * | 4/2007 | Holdsworth | F04C 18/16 62/501 |
| 2010/0233004 A1 | 9/2010 | Matsuzaka | |
| 2011/0005477 A1 * | 1/2011 | Terashima | F01K 23/065 123/41.51 |
| 2011/0031068 A1 | 2/2011 | Henshaw et al. | |
| 2012/0211093 A1 | 8/2012 | Grimes | |

* cited by examiner

TEMPERATURE CONTROL FOR COMPRESSOR

CROSS REFERENCE TO RELATED APPLICATIONS

The present application claims the benefit of U.S. Provisional Patent Application 61/802,266 filed Mar. 15, 2013, the contents of which is incorporated herein by reference in its entirety.

TECHNICAL FIELD

The present disclosure generally relates to temperature control systems for gas compressors.

BACKGROUND

Conventional rotary screw compressors use intermeshing rotors to form a compression cell (often referred to as a compression chamber) between the rotating rotors, close the cell, and then reduce the cell volume through screw rotation to compress a gas. The intermeshing rotors may be a single main rotor with two gate rotors or twin, axially-aligned, helical screw rotors. Because the gas compression process occurs in a continuous sweeping motion, rotary screw compressors produce very little pulsation or surge in the output flow of compressed gas.

As described by the physical gas laws, compressing any gas produces heat, and the hotter the gas gets the less efficient the compression process. Thus, removing heat during the compression process can improve the compression efficiency. Various means of cooling the gas in a conventional gas compressor are known. One common means, known as contact cooling, is to introduce a cooling fluid into the compression process that comes into direct contact with the compressible gas and cools it by evaporative cooling. The cooling fluid may be an oil, water, or other suitable fluid, for example. The cooling fluid may provide both a cooling function and a sealing function, such that the fluid seals the internal clearances within the compressor (e.g., between the rotors and between the each rotor and the wall of the compressor's housing). Such a fluid may be injected into the inlet flow into the compressor, where it is dispersed throughout the gas being compressed. Generally, the cooling fluid must then be removed from the resulting flow of compressed gas before being used to drive tools, equipment, and machinery. In contrast, compressing a gas without introducing a coolant into the compression cell is typically referred to as "dry" compression. However, at equivalent compression ratios, dry screw compressors generally generate higher temperatures than contact-cooled screw compressors because there is no fluid cooling in the compression cell.

Gas compressors may be required to operate under a wide range of ambient conditions, including temperature at or below the freezing point of water. Contact-cooled compressors using a cooling fluid to dissipate heat generated by the compression process may be required to operate in environments that could cause the cooling fluid to freeze, causing blockages, reduced performance, and/or damage to the compressor and/or cooling system. When operating at high ambient temperatures, the cooling fluid may become increasingly hot, making it less effective at cooling the compression process. Some existing compressor systems have various shortcomings relative to cooling the compression process. Accordingly, there remains a need for further contributions in this area of technology.

SUMMARY

According to at least one aspect of the present disclosure, an apparatus for cooling a coolant for a gas compressor comprises a compressor structured to generate a flow of compressed gas, a dryer in fluid communication with the compressor and structured to separate an entrained coolant from the compressed gas flow, and a coolant circuit. The coolant circuit comprises a tank to accumulate the coolant separated from the compressed gas flow, a pump in fluid communication with the tank and the compressor, the pump structured to introduce the coolant into the compressor, and thereby into the flow of compressed gas, and to circulate the coolant through the coolant circuit, a first intercooler in thermal communication with the dryer and in fluid communication with the tank and the pump, the first intercooler structured to transfer heat from the coolant circuit to the compressed gas flow via the dryer, and a valve disposed between the tank and the first intercooler, the valve structured to route at least a portion of the coolant in the coolant circuit through the first intercooler depending on a temperature of the coolant relative to prescribed low and high temperature limits.

In certain embodiments, the valve is a thermostatic valve adapted to activate and deactivate depending on the coolant temperature relative to the prescribed low and high temperature limits. In alternative embodiments, the valve is a solenoid actuated by a controller structured to operate upon a change in coolant temperature, wherein the controller is configured to activate and deactivate the solenoid depending on the coolant temperature relative to the prescribed low and high temperature limits. The coolant temperature is the temperature of the coolant in the tank. The coolant is water, the compressed gas is air, and the compressor is a contact-cooled rotary screw compressor.

In at least one embodiment, the apparatus further comprises a gas circuit, which comprises the compressor, a second intercooler disposed downstream of and in fluid communication with the compressor and structured to lower a gas temperature of the compressed gas flow and to form a condensate, a second separator disposed downstream of and in fluid communication with the second intercooler and structured to separate the condensate from the compressed gas flow, an integrated dryer disposed downstream of and in fluid communication with the second separator and structured to further lower the temperature of the compressed gas flow and to form additional condensate, wherein the integrated dryer includes the dryer in fluid communication with a first separator, the first separator structured to separate the additional condensate from the compressed gas flow, and in thermal communication with the first intercooler, and a compressed gas outlet disposed downstream of and in fluid communication with the integrated dryer. In at least one embodiment, the tank includes a temperature sensor in communication with a controller configured to activate and deactivate the valve depending on the coolant temperature relative to prescribed high and low temperature limits.

According to at least one aspect of the present disclosure, a method for cooling a coolant for a gas compressor comprises introducing a coolant into a gas compressor, the compressor structured to generate a flow of compressed gas, such that the coolant is substantially dispersed in the compressed gas flow, separating the coolant entrained in the compressed gas flow from the compressed gas using a dryer and a first separator in fluid communication with the compressor, routing the coolant separated from the compressed gas flow to a cooling circuit, which comprises a tank to accumulate the coolant separated from the compressed gas flow, a pump in fluid communication with the tank and the compressor, the pump structured to introduce the coolant into the compressor, and thereby into the flow of compressed gas, and to circulate the coolant through the coolant circuit, a first intercooler in thermal communication with the dryer and in fluid communication with the tank and the pump, the first intercooler structured to transfer heat from the coolant circuit to the compressed gas flow via the dryer, and a valve disposed between the tank and the first intercooler, the valve structured to route at least a portion of the coolant in the coolant circuit through the first intercooler depending on a temperature of the coolant relative to low and high temperature limits. The method further comprises monitoring the coolant temperature, actuating the valve when the coolant temperature exceeds the high temperature limit to route at least a portion of the coolant in the coolant circuit from the tank through the first intercooler to the pump, and actuating the valve when the coolant temperature is below the low temperature limit to bypass the first intercooler and route coolant from the tank to the pump.

In at least one embodiment, the compressor is a portion of a gas circuit, which further comprises a second intercooler disposed downstream of and in fluid communication with the compressor and structured to lower a gas temperature of the compressed gas flow and to form a condensate, a second separator disposed downstream of and in fluid communication with the second intercooler and structured to separate the condensate from the compressed gas flow, an integrated dryer disposed downstream of and in fluid communication with the second separator and structured to further lower the temperature of the compressed gas flow and to form additional condensate, wherein the integrated dryer includes the dryer in fluid communication with a first separator, the first separator structured to separate the additional condensate from the compressed gas flow, wherein the integrated dryer is in thermal communication with the first intercooler, and a compressed gas outlet disposed downstream of and in fluid communication with the integrated dryer. In certain embodiments, the tank includes a temperature sensor in communication with a controller configured to activate and deactivate the valve depending on the coolant temperature relative to upper and lower temperature limits.

According to at least one aspect of the present disclosure, a gas compression system comprises a gas circuit comprising a compressor structured to generate a flow of compressed gas, the compressed gas flow including an entrained coolant therein, a first intercooler disposed downstream of and in fluid communication with the compressor and structured to lower a gas temperature of the compressed gas flow and to form a condensate, wherein the condensate includes at least a portion of the entrained coolant, a first separator disposed downstream of and in fluid communication with the first intercooler and structured to separate the condensate from the compressed gas flow, an integrated dryer disposed downstream of and in fluid communication with the first separator and structured to further lower the temperature of the compressed gas flow and to form additional condensate, wherein the integrated dryer includes a dryer in fluid communication with a second separator, the second separator structured to separate the additional condensate from the compressed gas flow, and in thermal communication with a second intercooler through which the coolant flows, and a compressed gas outlet disposed downstream of and in fluid communication with the integrated dryer, and a coolant circuit, which comprises a tank structured to accumulate the coolant separated by the first and second separators, the tank further structured to supply coolant to the coolant circuit, a pump in fluid communication with the tank and the compressor of the gas circuit, the pump structured to introduce the coolant into the compressor, and thereby into the flow of compressed gas, and to circulate the coolant through the coolant circuit, the second intercooler in thermal communication with the dryer of the gas circuit and in fluid communication with the tank and the pump, the second intercooler structured to transfer heat from the coolant circuit to the compressed gas flow via the dryer, and a valve disposed between the tank and the second intercooler, the valve structured to route at least a portion of the coolant in the coolant circuit through the second intercooler depending on a temperature of the coolant relative to prescribed low and high temperature limits. In at least one embodiment, the valve is activated to route at least a portion of the coolant in the coolant circuit through the second intercooler when the coolant temperature exceeds the prescribed high temperature limit.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present application discloses various embodiments of a gas compression system and methods for using and constructing the same. Gas compressors, such as contact-cooled rotary screw air compressors, may be required to operate under a wide range of ambient conditions, with temperatures ranging from approximately 0° C. to approximately 46° C. and relative humidity levels ranging from 0% to 100%. Contact-cooled compressors using a cooling fluid to dissipate heat generated by the compression process by evaporative cooling may be required to operate in environments that could cause the cooling fluid to freeze, causing blockages, reduced performance, and/or damage to the compressor and/or cooling system. Consequently, for efficient operation of the compressor, warming of the cooling fluid used in the compressor may be desirable under such conditions. When operating at high ambient temperatures, the cooling fluid used in a contact-cooled compressor may become increasingly hot, making it less effective at cooling the compression process. Consequently, for efficient operation of the compressor, cooling of the cooling fluid may be desirable under such conditions.

Figure 1:
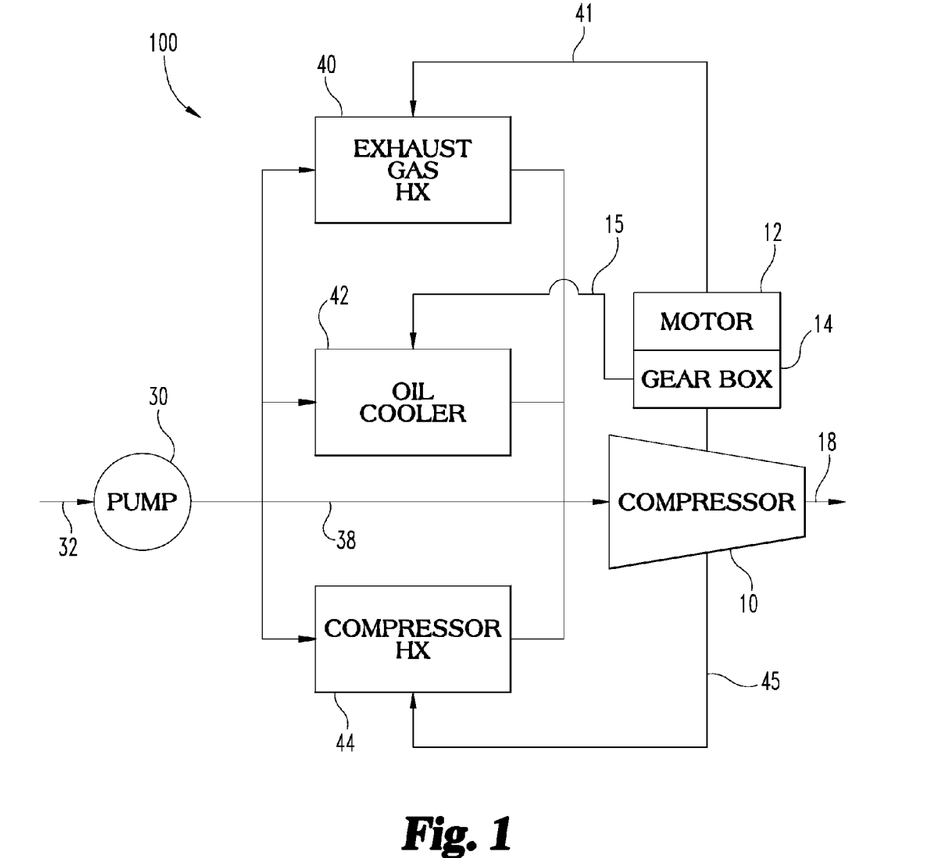
FIG. 1 is a schematic view of a gas compression system according to an embodiment of the present disclosure.

A gas compressor system according to at least one embodiment of the present disclosure is shown in FIG. 1. As shown in FIG. 1, a gas compressor system 100 may include a compressor 10 in fluid communication with a pump 30 structured to supply a cooling fluid to an inlet port of the compressor 10 and, further, to circulate the cooling fluid through the compressor 10 and the system 100. The cooling fluid may be supplied to the inlet port such that the cooling fluid is substantially dispersed into an incoming flow of gas to be compressed. Where the gas to be compressed is ambient air, the source of the incoming flow of gas may be the atmosphere surrounding the gas compression system 100. The compressor 10 may be any type of compressor that uses contact cooling to dissipate heat generated by compression of a gas. By way of non-limiting example, the compressor 10 may be a reciprocating compressor, a rotary screw compressor, or a scroll compressor.

The compressor 10 may further include a drive motor 12 mechanically connected to a gearbox 14 that is cooled and lubricated with a lubricant, such as oil. In such an embodiment, the motor 12 may generate relatively warm exhaust gas while driving the compressor 10, and the gearbox 14 may use a lubricant that absorbs heat generated by operation of the motor 12. In at least one embodiment, the compressor 10 may include a drive motor 12 without a gearbox. The pump 30 may be any suitable type of pump capable of circulating a cooling fluid through the compressor 10 and the system 100. The cooling fluid may be any suitable fluid that is capable of providing a cooling effect to dissipate heat generated by the compressor during the compression process. By way of non-limiting example, the cooling fluid may be an oil or water.

The pump 30 may supply cooling fluid directly to the inlet of the compressor 10. Alternatively, the pump 30 may push cooling fluid through one or more heat exchangers before supplying the cooling fluid to the inlet of the compressor 10. As described herein, under cold ambient conditions, it may be desirable to heat the cooling fluid before it is introduced into the compressor 10. As shown in FIG. 1, the gas compressor system 100 may include one or more heat exchangers structured to heat the incoming flow of cooling fluid to the compressor 10. In at least one embodiment where the compressor 10 includes the drive motor 12 and gearbox 14, the system 100 may include an exhaust gas heat exchanger 40. The exhaust gas heat exchanger 40 may be structured to accept relatively warm exhaust gas, generated by the compressor 10 and transported via an exhaust gas flow line 41, and cooling fluid supplied by the pump 30 via a coolant flow line 32. The exhaust gas heat exchanger 40 enables heat exchange between the relatively warm exhaust gas flow 41 and the cooling fluid, thereby raising the temperature of the cooling fluid before entering the compressor 10.

In at least one embodiment, the system 100 may include a compressor heat exchanger 44 as shown in FIG. 1. The compressor heat exchanger 44 may be structured to enable heat exchange between the relatively warm compressor 10 and the cooling fluid circulated by the pump 30, thereby raising the temperature of the cooling fluid before entering the compressor 10. Accordingly, the compressor heat exchanger 44 may be in thermal contact with the compressor 10 such that a heat flow 45 flows from the compressor 10 to the cooling fluid via the compressor heat exchanger 44.

In embodiments where the compressor 10 includes the drive motor 12 and gearbox 14, the system 100 may include an oil cooler 42 as shown in FIG. 1. The oil cooler 42 may be structured to facilitate heat exchange between relatively warm lubricant flowing through the motor 12 and/or gearbox 14 of the compressor 10 and the cooling fluid supplied by the pump 30 via the coolant flow line 32, thereby raising the temperature of the cooling fluid before entering the compressor 10. Conversely, the cooling fluid cools the relatively warm oil, thereby improving the performance of the compressor 10. Accordingly, the oil cooler 42 may be in fluid connection with the motor 12 and/or gearbox 14 via an oil flow line 15.

As shown in FIG. 1, the compression system 100 may further include a bypass line 38 fluidly connecting the pump 30 and the compressor 10, thereby directing the flow of cooling fluid directly from the pump 30 to the compressor 10 and bypassing the exhaust gas heat exchanger 40, the oil cooler 42, and/or the compressor heat exchanger 44. For example, when the temperature of the cooling fluid is above a prescribed low temperature limit, heating of the cooling fluid flow may not be necessary. In which case, the flow of cooling fluid may bypass the exhaust gas heat exchanger 40, the oil cooler 42, and/or the compressor heat exchanger 44 via the bypass line 38. Alternatively, when the temperature of the cooling fluid is below a prescribed low temperature limit, due to operation of the system 100 in a cold environment or otherwise, heating of the cooling fluid flow may be desirable. In which case, the flow of cooling fluid may be directed through the exhaust gas heat exchanger 40, the oil cooler 42, and/or the compressor heat exchanger 44 to raise the temperature of the cooling fluid and prevent it from freezing.

Figure 2:
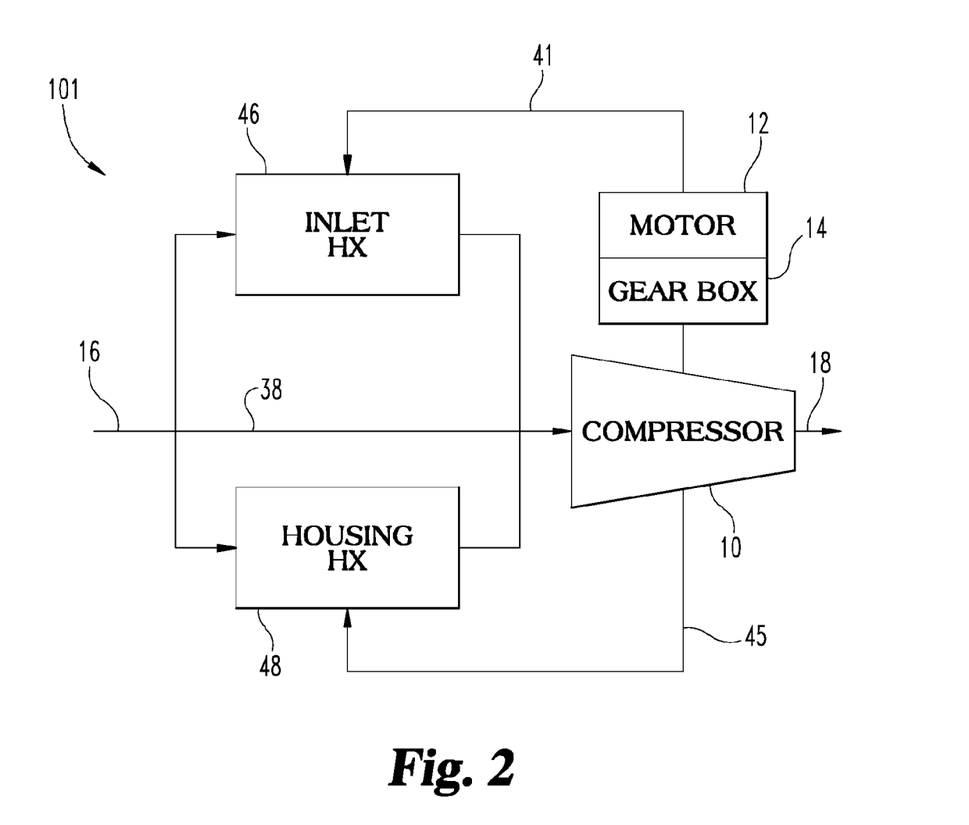
FIG. 2 is a schematic view of a gas compression system according to an alternative embodiment of the present disclosure.

Under certain operating conditions, it may be desirable to heat the flow of incoming gas entering the inlet of the compressor 10. In at least one embodiment according to the present disclosure, as shown in FIG. 2, a gas compressor system 101 may include one or more heat exchangers structured to heat an incoming gas flow 16 to the compressor 10. Where the gas to be compressed is ambient air, the source of the incoming gas flow 16 may be the atmosphere surrounding the gas compression system 101. In embodiments where the compressor 10 includes the drive motor 12 and gearbox 14, the system 101 may include an inlet heat exchanger 46. The inlet heat exchanger 46 may be structured to accept relatively warm exhaust gas, generated by the drive motor 12 and transported via the exhaust gas flow line 41, and the incoming gas flow 16 drawn in by operation of the compressor 10. The inlet heat exchanger 46 enables heat exchange between the relatively warm exhaust gas flow 41 and the incoming gas flow 16, thereby raising the temperature of the incoming gas before entering the compressor 10. In at least one exemplary embodiment, the temperature of the exhaust gas may be ambient plus approximately 40° C.

In at least one alternative embodiment, the system 101 may include a housing heat exchanger 48 as shown in FIG. 2. The housing heat exchanger 48 may be structured to enable heat exchange between the relatively warm housing of the compressor 10 and the incoming gas flow 16 generated by the compressor 10, thereby raising the temperature of the incoming air before entering the compressor 10. Accordingly, the housing heat exchanger 48 may be in thermal contact with the compressor 10 such that the heat flow 45 flows from the compressor 10 to the incoming gas flow 16 via the housing heat exchanger 48.

As shown in FIG. 2, the compression system 101 may further include a bypass line 38 fluidly connecting the source of gas to be compressed and the compressor 10, thereby directing the incoming gas flow 16 directly to the compressor 10 and bypassing the inlet heat exchanger 46 and/or the housing heat exchanger 48. For example, when the temperature of the cooling fluid is above a prescribed low temperature limit, heating of the cooling fluid flow may not be necessary. In which case, the incoming gas flow 16 may bypass the inlet heat exchanger 46 and/or the housing heat exchanger 48 via the bypass line 38. Alternatively, when the temperature of the cooling fluid is below a prescribed low temperature limit, due to operation of the system 101 in a cold environment or otherwise, heating of the cooling fluid flow may be desirable. In which case, the incoming gas flow 16 may be directed through the inlet heat exchanger 46 and/or the housing heat exchanger 48 to raise the temperature of the cooling fluid and prevent it from freezing.

As will be appreciated by one skilled in the art having the benefit of the present disclosure, the exhaust gas heat exchanger 40, the oil cooler 42, the compressor heat exchanger 44, the inlet heat exchanger 46, and the housing heat exchanger 48 may be any type, and different types, of heat exchanger suitable to accomplish the necessary heat transfer, including but not limited to shell and tube exchangers, plate exchangers, plate fin exchangers, and exchangers disposed within a plenum.

Figure 3:
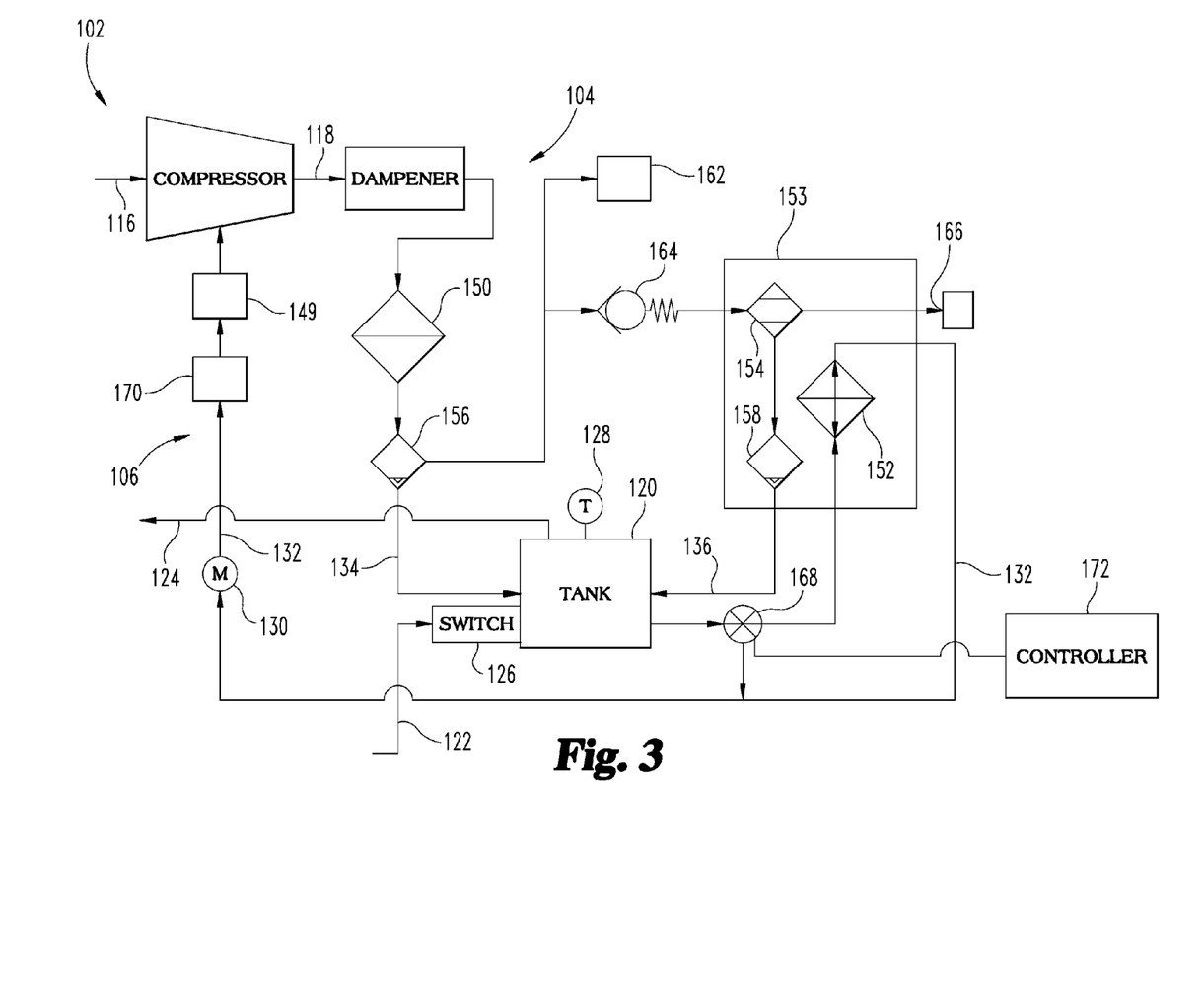
FIG. 3 is a schematic view of a gas compression system according to an alternative embodiment of the present disclosure.

The embodiments of the present disclosure may be incorporated in a gas compressor system that includes one or more intercoolers, separators, and integrated dryers to separate a cooling fluid from the flow of compressed gas generated by a compressor prior to be delivered to a point of use. In at least one embodiment according to the present disclosure, as shown in FIG. 3, a gas compression system 102 may include a gas circuit 104 through which a gas is compressed, dried, and delivered to an outlet 166. The gas compression system 102 may further include a coolant circuit 106 through which a coolant introduced into a compressor may be reclaimed from the gas circuit 104 and recirculated for reuse in the operation of the system 102.

The gas circuit 104 may include a compressor 110 configured to compress an incoming gas flow 116 and supply the resulting compressed gas to a compressed gas line 118. The compressor 110 may be any type of compressor that uses contact cooling to dissipate heat generated by compression of the gas. In such an embodiment, a cooling fluid may be introduced into the inlet of the compressor 110 such that the cooling fluid is substantially dispersed into the incoming gas flow 116. By way of non-limiting example, the compressor 110 may be a reciprocating compressor, a rotary screw compressor, or a scroll compressor. In at least one embodiment, the compressor 110 may include a drive motor mechanically connected to a gearbox that is oil cooled and lubricated.

The gas circuit 104 may include a pulsation dampener 160 (i.e., a silencer) disposed along the compressed gas line 118 between the compressor 110 and a first intercooler 150. The first intercooler 150, which may be air or water cooled, reduces the temperature of the compressed gas flowing through the compressed gas line 118, thereby causing the cooling fluid dispersed within the compressed gas flow to condense out of the flow as a condensate. In embodiments where the cooling fluid is water, the condensate may be primarily liquid water as water vapor within the compressed gas flow condenses out of the flow. In embodiments where the cooling fluid is an oil the condensate may be a mixture of oil and liquid water, the liquid water forming from water vapor dispersed in the uncompressed gas. Contaminants and other substances may further condense out of the compressed gas flow as it passes through the first intercooler 150.

The gas circuit 104 may further include a first separator 156 disposed downstream of the first intercooler 150. The first separator 156 may be structured to separate the condensate formed in the intercooler 150 from the flow of compressed gas. The first separator 156 may include a drain in fluid communication with a first drain line 134 of the coolant circuit 106 to remove the condensate from the gas circuit 104 as described further herein. The gas circuit 104 may include a blowdown line 162 downstream of the first separator 156, the blowdown line 162 configured to enable compressed gas to be blown out of the compressed gas line 118 to prevent a build-up of contaminants.

The gas circuit 104 may further include an integrated dryer unit 153 disposed downstream of the first separator 156 but on a separate branch of the compressed gas line 118 from the blowdown line 162. The gas circuit 104 may include a check valve 164 disposed along the compressed gas line 118 upstream of the integrated dryer unit 153 to isolate the integrated dryer unit 153 from the blowdown line 162 as needed. The integrated dryer unit 153 may include a dryer 154 in fluid communication with a second separator 158. The dryer 154 may be structured to cause condensation of additional cooling fluid from the flow of compressed gas conveyed via the compressed gas line 118. The second separator 158 may include a drain in fluid communication with a second drain line 136 of the coolant circuit 106 to remove the condensate from the gas circuit 104.

In at least one embodiment, the dryer 154 may be in communication with a refrigeration circuit (not shown) capable of generating a cold sink to lower the temperature of the compressed gas, thereby facilitating condensation of the cooling fluid. The dryer 154 may be in thermal communication with a second intercooler 152, which is a component of the coolant circuit 106 as described further herein. The dryer 154 and the second intercooler 152 may be configured to operate such that heat may flow from the second intercooler 152 to the dryer 154 to warm the flow of compressed air after the condensate has been separated, for example, by the second separator 158. Upon exiting the integrated dryer unit 153, the compressed gas line 118 terminates at the outlet 166, where tools or machinery needing compressed gas may be connected to the system 102.

In at least one embodiment according to the present disclosure, the gas circuit 104 may include the inlet heat exchanger 46 and/or the housing heat exchanger 48 disposed between the source of incoming gas flow 116 and the compressor 110 as shown in FIG. 2 and configured to operate under certain conditions as described herein.

As shown in FIG. 3, the coolant circuit 106 of the gas compression system 102 interfaces with the gas circuit 104 at the compressor 110 and, in certain embodiments, at the integrated dryer unit 153, the first separator 156, and the second separator 158. The coolant circuit 106 may include a pump 130 structured to supply a cooling fluid via a coolant line 132 to an inlet port of the compressor 110 and, further, to circulate the cooling fluid through the compressor 110 and the system 102. The pump 130 may be any suitable type of pump capable of circulating a cooling fluid through the compressor 110 and the system 102.

The coolant circuit 106 may further include a storage tank 120 or suitable accumulator having inlets and outlets and structured to accumulate condensate generated by the first separator 156 and the second separator 158 and to store cooling fluid for use in the gas circuit 104 as described herein. Inlets to the storage tank 120 include a first drain line 134 fluidly connecting the first separator 156 of the gas circuit 104 to the storage tank 120, a second condensate drain line 136 fluidly connecting the second separator 158 of the gas circuit 104 to the storage tank 120, and a top-up coolant line 122 fluidly connecting the storage tank 120 to a supply of cooling fluid. The top-up coolant line 122 may include a switch 126 having a fluid level sensor and structured to open and close the top-up coolant line 122 to maintain a desired amount of cooling fluid in the storage tank 120. Outlets from the storage tank 120 include an excess coolant drain line 124, to enable excess cooling fluid to be removed from the storage tank 120, and the coolant line 132, which fluidly connects the storage tank 120 to the pump 130. The storage tank 120 may further include a temperature sensor 128 structured to measure a temperature of the coolant stored in the storage tank 120.

The coolant circuit 106 may further include the second intercooler 152 disposed within the integrated dryer unit 153, which may be disposed between the storage tank 120 and the pump 130 in the coolant circuit 106. The second intercooler 152 enables heat transfer between the compressed gas flowing through the dryer 154 of the gas circuit 104 and the cooling fluid flowing through the coolant line 132. Under certain operating conditions, the second intercooler 152 may facilitate cooling of the cooling fluid flowing through the coolant circuit 106 by transferring heat from the relatively warm cooling fluid to the relatively cold compressed gas from the dryer 154. The gas compression system 102 may include both the first intercooler 150 and the second intercooler 152 to ensure efficient operation of the second intercooler 152. Without the first intercooler 150, and the accompanying first separator 156, liquid coolant (in addition to vapor coolant) may enter the dryer 154, which may reduce the efficiency of the heat exchange process with the second intercooler 152 within the integrated dryer unit 153.

The coolant circuit 106 may further include a bypass valve 168 disposed between the storage tank 120 and the second intercooler 152. The bypass valve 168 may be structured to selectively enable cooling fluid from the storage tank 120 to flow directly to the pump 130 without first being routed through the second intercooler 152. Accordingly, the bypass valve 168 enables the cooling fluid to be routed through the second intercooler 152 when desired, specifically when the temperature of the cooling fluid exceeds a prescribed temperature limit. The bypass valve 168 may be any suitable flow actuator, including but not limited to a thermostatic control valve, configured to activate at a prescribed temperature, or a solenoid valve activated by a controller 172.

In at least one embodiment, the coolant circuit 106 may include a coolant treatment unit 170 disposed along the coolant line 132 between the pump 130 and the inlet to the compressor 110. The coolant treatment unit 170 may include at least filters to remove contaminants from the flow of cooling fluid before the fluid is introduced into the compressor 110.

In at least one embodiment according to the present disclosure, the coolant circuit 106 may include a heat exchanger 149 disposed between the pump 130 and the compressor 110. The heat exchanger 149 may be the exhaust gas heat exchanger 40, the compressor heat exchanger 44, and/or the oil cooler 42 disposed between the pump 130 and the compressor 110 as shown in FIG. 1 and may be configured to operate under certain conditions as described herein. As will be appreciated by one skilled in the art having the benefit if the present disclosure, the heat exchanger 149 may be any type, and different types, of heat exchanger suitable to accomplish the necessary heat transfer, including but not limited to shell and tube exchangers, plate exchangers, plate fin exchangers, and exchangers disposed within a plenum.

In at least one embodiment according to the present disclosure, the gas to be compressed may be ambient air ranging in temperature from approximately 0° C. to approximately 46° C. and ranging in relative humidity from 0% to 100%. In operation, the flow rate of the incoming gas flow 116 may vary from approximately 1.6 cubic meters per minute ($m^3$/min) to approximately 10 $m^3$/min. The compressor 110 may generate compressed gas ranging from approximately 5.0 bar-gauge (barG) to approximately 10.5 barG and from 80° C.-140° C. Following along the gas circuit 104, the first separator 156 may be about 80% to about 90% efficient depending upon the temperature and rate of the incoming gas flow 116. The separated condensate may have a temperature of approximately 10° C. above ambient temperature and typically will not exceed 56° C. The compressed gas exiting the first separator 156 may have a temperature of approximately 10° C. above the ambient.

After the compressed gas passes through the check valve 164, enters the integrated dryer unit 153, and exits the dryer 154 to the compressed gas outlet 166, the compressed gas may have a maximum dewpoint of approximately 7° C. The condensate separated by the second separator 158 may have a temperature between approximately 3° C. and 7° C. prior to flowing to the storage tank 120. Cooling fluid accumulated and stored in the storage tank 120 may have a temperature between about 10° C. and about 56° C. before being routed directly to the pump 130 or being at least partially routed to the second intercooler 152 via the bypass valve 168. Exiting the integrated dryer unit 153, the cooling fluid may have a temperature between about 15° C. and about 30° C. with a nominal temperature of approximately 20° C. Likewise, the cooling fluid may have roughly the same properties after passing through the pump 130 and, optionally, the coolant treatment unit 170. The cooling fluid supplied to the inlet of the compressor 110 may have a flow rate of approximately 70 liters per hour (L/hr) to approximately 100 L/hr, and a temperature between approximately 15° C. to 30° C. with a nominal temperature of approximately 20° C.

When the gas compression system 102 is placed in service in a relatively cold environment, portions of the coolant circuit 106 may become frozen due to the cold temperatures, causing blockages, reduced performance, and/or damage to the system 102. Where the cooling fluid used in the system 102 is water, such problems may develop as the ambient temperature nears 0° C. Operation of the system 102 may raise the temperature of the cooling fluid somewhat. For example, when operating the gas compression system 102 at steady-state in cold conditions where the ambient temperature is 2° C., the resulting temperature of the cooling fluid may be approximately 10° C., including the net effects of heat transferred from the compressor 110, the first intercooler 150, the integrated dryer unit 153, the storage tank 120, the pump 130, and other heat transfer effects in the system 102. Nonetheless, for efficient operation of the gas compression system 102, warming of the cooling fluid entering the inlet of the compressor 110 may be desirable under such conditions.

In operation, should the temperature of the incoming cooling fluid (i.e., water) entering the compressor 110 be below about 15° C., then the cooling fluid may be advantageously pre-heated using heat generated by the compressor 110. Under such conditions, the coolant circuit 106 may employ the exhaust gas heat exchanger 40, the compressor heat exchanger 44, and/or the oil cooler 42 as shown in FIG. 1 to warm the cooling fluid and prevent freezing within the coolant circuit 106. In an exemplary embodiment, pre-heating the cooling fluid using the exhaust gas heat exchanger 40, the compressor heat exchanger 44, and/or the oil cooler 42 to raise the temperature of the cooling fluid above 15° C. provides the desired operating conditions for the gas compression system 102. Further, for efficient operation of the gas compression system 102, the degree of pre-heating of the cooling fluid may be controlled to effect a cooling fluid temperature of approximately 20° C.

Alternatively or additionally, freezing and damage of the coolant circuit 106 may be avoided by warming incoming gas flow 116 entering the inlet of the compressor 110. A relatively warm incoming gas flow 116 will tend to indirectly increase the temperature of the cooling fluid as heat is transferred from the incoming flow 116 to the cooling fluid during operation of the system 102. Accordingly, the gas circuit 104 may employ the inlet heat exchanger 46 and/or the housing heat exchanger 48 as shown in FIG. 2 to warm the cooling fluid and prevent freezing within the coolant circuit 106. In an exemplary embodiment, pre-heating the incoming flow 116 to 20° C. may raise the steady-state temperature of the water cooling fluid to about 28° C. It may be desirable to limit pre-heating the incoming air flow 116 to a maximum of 20° C. to limit the temperature of the cooling fluid to less than about 30° C. Further, for efficient operation of the gas compression system 102, the degree of pre-heating of incoming air flow 116 may be controlled to effect a cooling fluid temperature of approximately 20° C.

In operation, if the temperature of the cooling fluid in the storage tank 120 exceed a prescribed upper temperature limit, as indicated by the temperature sensor 128 or otherwise, then the cooling fluid may be advantageously cooled via the second intercooler 152 using the cold sink provided by the dryer 154. Under such conditions, the bypass valve 168 may be actuated to direct at least a portion of the cooling fluid to the second intercooler 152 prior to recirculation by the pump 130. The portion of the cooling fluid directed through the second intercooler 152 may transfer heat to the relatively cold compressed gas in the gas compression system 102, thereby lowering the temperature of the cooling fluid. The bypass valve 168 may continue to route at least a portion of the flow of cooling fluid to through intercooler 152 until the temperature of the cooling fluid in the storage tank 120 falls below a prescribed lower temperature limit. In at least one embodiment, the upper temperature limit may be about 30° C., and the lower temperature limit may be about 22° C.

As shown in FIG. 1, the gas compression system 102 may further include a controller 172 and various sensors, in addition to the temperature sensor 128, to measure and interpret the temperature of the incoming gas flow 116, the cooling fluid in the coolant line 132, and/or the cooling fluid in the storage tank 120. The controller 172 may operate upon a change in the temperature of the cooling fluid to adjust the flow rates through the heat exchangers 40, 42, 44, 46, 48, through the second intercooler 152, and/or the flow rate of the cooling fluid generated by the pump 130 depending on the temperature relative to prescribed low and high temperature limits. For example, the flow of the cooling fluid and gas to be compressed may be directed through the heat exchangers 40, 42, 44, 46, 48 (as applicable), via appropriate valves and/or regulators and as directed by the controller 172, when the temperature of the cooling fluid falls below the prescribed low temperature limit. By further example, the flows of the cooling fluid and gas to be compressed may partially or entirely bypass the heat exchangers 40, 42, 44, 46, 48 (as applicable), via appropriate valves and/or regulators and as directed by the controller 172, when the cooling fluid rises above the prescribed high temperature limit.

In some embodiments the controller 172 may comprise digital circuitry, analog circuitry, or a hybrid combination of both of these types. The controller 172 may be programmable, an integrated state machine, or a hybrid combination thereof. The controller 172 may include one or more Arithmetic Logic Units (ALUs), Central Processing Units (CPUs), memories, limiters, conditioners, filters, format converters, or the like which are not shown to preserve clarity. In one form, the controller 172 is of a programmable variety that executes algorithms and processes data in accordance with operating logic that is defined by programming instructions (such as software or firmware). Alternatively or additionally, operating logic for the controller 172 may be at least partially defined by hardwired logic or other hardware. It should be appreciated that controller 172 may be exclusively dedicated to monitor and control the temperature of the cooling fluid or may further be used in the regulation, control, and or activation of one or more other subsystems or aspects of the gas compression system 102.

Figure 4:
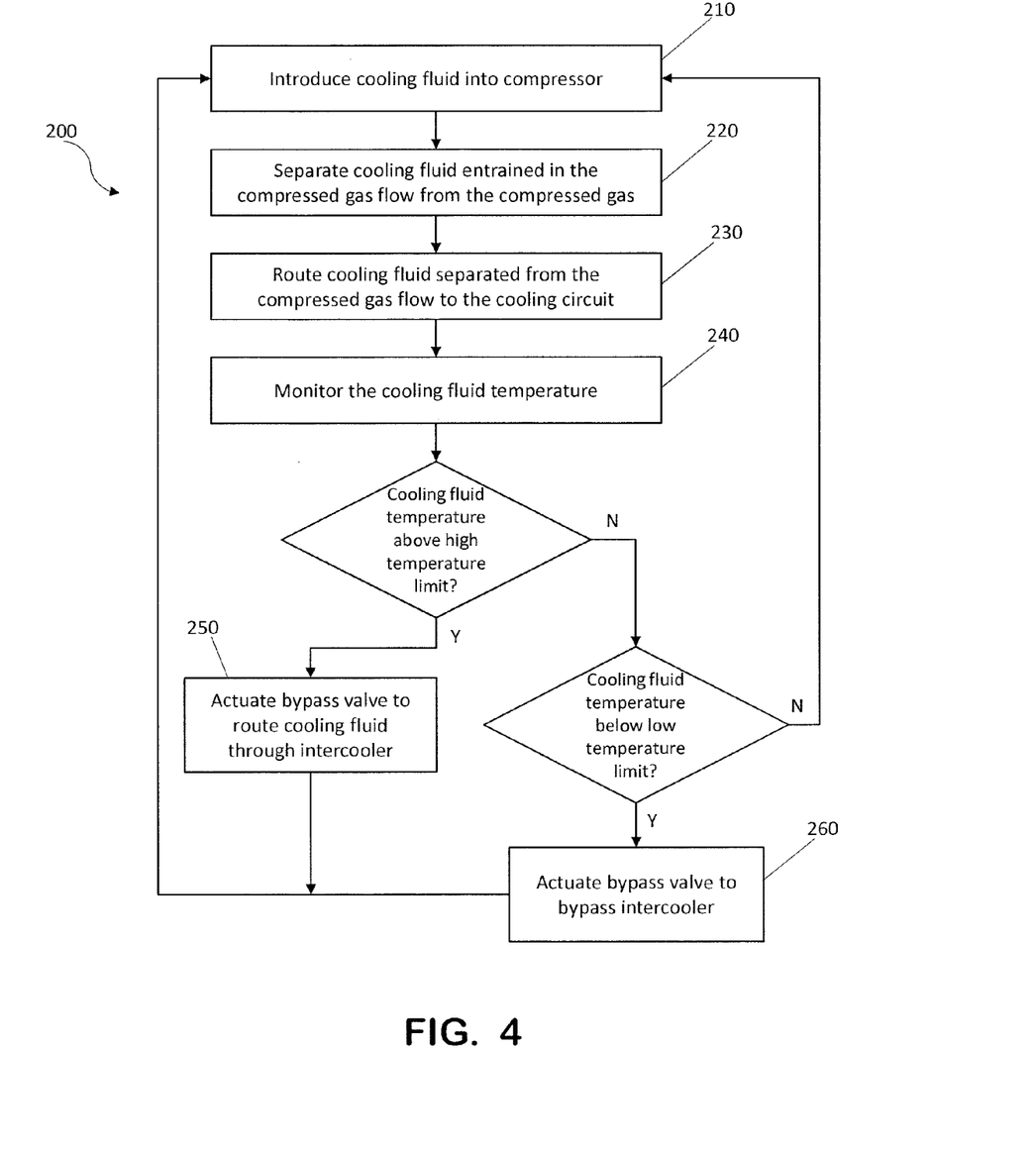
FIG. 4 is a schematic flow diagram of a method for cooling a coolant for a gas compressor according to an embodiment of the present disclosure.

In one aspect of the present disclosure as shown in FIG. 4, the gas compression system 102 may be used in a method 200 to control the temperature of the cooling fluid, particularly when the gas compression system 102 is operated in relatively high ambient temperatures. The method 200 may include a step 210 of introducing the cooling fluid into the compressor 110, such that the cooling fluid is substantially dispersed in the compressed gas flow. The method 200 may include a step 220 of separating the cooling fluid entrained in the compressed gas flow from the compressed gas using the dryer 154 and the second separator 158 in fluid communication with the compressor 110, and a step 230 of routing the cooling fluid separated from the compressed gas flow to the cooling circuit 104 via the second condensate line 136. The method 200 may further include a step 240 of monitoring the cooling fluid temperature. The step 240 may be performed using the temperature sensor 128 in the storage tank 120 or at another suitable location. The method 200 may further include a step 250 of actuating the bypass valve 168 when the cooling fluid temperature exceeds the high temperature limit, thereby routing at least a portion of the cooling fluid in the coolant circuit 106 from the storage tank 120, through the second intercooler 152, and to the pump 130. The method 200 may include a step 260 of actuating the bypass valve 168 when the cooling fluid temperature is below the low temperature limit to bypass the second intercooler 152 and route cooling fluid from the storage tank 120 to the pump 130. Accordingly, the gas compression system 102 may be used with the method 200 to control the temperature of the cooling fluid during operation of the system 102. Specifically, the gas compression system 102 may be used with the method 200 to limit the temperature increase of the cooling fluid when the gas compression system 102 is operated in relatively high ambient temperatures.

While various embodiments of a gas compression system, and methods for using the same, have been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for cooling a coolant for a gas compressor, the apparatus comprising:
   a compressor structured to generate a flow of compressed gas;
   a dryer in fluid communication with the compressor to receive an outlet flow from the compressor, the dryer further structured to separate an entrained coolant from the compressed gas flow by cooling the flow of compressed gas to form a condensate of the entrained coolant; and
   a coolant circuit, the coolant circuit comprising:
      an accumulator to accumulate the coolant separated from the compressed gas flow, the accumulator in fluid communication with the dryer via a passage that is separate and wart from a passage that conveys the flow of compressed gas from the compressor such that the bulk flow of compressed air bypasses the accumulator,
      a pump in fluid communication with the accumulator and the compressor, the pump structured to introduce the coolant into the compressor, and thereby into the flow of compressed gas, and to circulate the coolant through the coolant circuit,
      an intercooler in thermal communication with the dryer and in fluid communication with the accumulator and the pump, the intercooler structured to transfer heat from the coolant circuit to the compressed gas flow via the dryer at a downstream compressor flow location of the dryer, wherein the dryer is structured to cool the flow of compressed gas, and wherein the intercooler is structured to heat the condensed gas after it has been cooled by the dryer as a result of being located at a downstream compressor flow location of the dryer, and
      a valve disposed between the accumulator and the intercooler, the valve structured to enable at least a portion of the coolant in the coolant circuit to flow through the first intercooler depending on a temperature of the coolant relative to prescribed low and high temperature limits.

2. The apparatus of claim 1, wherein the valve is a thermostatic valve adapted to activate and deactivate depending on the coolant temperature relative to the prescribed low and high temperature limits.

3. The apparatus of claim 1, wherein the valve is a solenoid actuated by a controller structured to operate upon a change in coolant temperature, wherein the controller is configured to activate and deactivate the solenoid depending on the coolant temperature relative to the prescribed low and high temperature limits.

4. The apparatus of claim 1, wherein the temperature of the coolant is the temperature of the coolant in the accumulator.

5. The apparatus of claim 1, wherein the coolant is water, the compressed gas is air, and the compressor is a contact-cooled rotary screw compressor.

6. The apparatus of claim 1, the apparatus further comprising:
   a gas circuit, the gas circuit comprising:
      the compressor;
      another intercooler disposed downstream of and in fluid communication with the compressor and structured to lower a gas temperature of the compressed gas flow and to form a condensate,
      a second separator disposed downstream of and in fluid communication with the another intercooler and structured to separate the condensate from the compressed gas flow,
      an integrated dryer disposed downstream of and in fluid communication with the second separator and structured to further lower the temperature of the compressed gas flow and to form additional condensate, wherein the integrated dryer includes the dryer in fluid communication with a first separator, the first separator structured to separate the additional condensate from the compressed gas flow, and in thermal communication with the intercooler, and
      a compressed gas outlet disposed downstream of and in fluid communication with the integrated dryer.

7. The apparatus of claim 1, wherein the accumulator includes a temperature sensor in communication with a controller configured to activate and deactivate the valve depending on the coolant temperature relative to prescribed high and low temperature limits.

8. A method for cooling a coolant for a gas compressor, the method comprising:
   introducing a coolant into a gas compressor, the compressor structured to generate a flow of compressed gas, such that the coolant is substantially dispersed in the compressed gas flow;
   separating the coolant entrained in the compressed gas flow from the compressed gas using a dryer and a first separator in fluid communication with the compressor;
   routing the coolant separated from the compressed gas flow to a cooling circuit, the cooling circuit comprising:
      an accumulator to accumulate the coolant separated from the compressed gas flow, the accumulator structured to receive coolant via a passage that is independent of the passage of compressed gas flow such that the compressed gas flow does not flow through the accumulator,
      a pump in fluid communication with the accumulator and the compressor, the pump structured to introduce the coolant into the compressor, and thereby into the flow of compressed gas, and to circulate the coolant through the coolant circuit,
      an intercooler in thermal communication with the dryer and in fluid communication with the accumulator and the pump, the intercooler structured to transfer heat from the coolant circuit to the compressed gas flow via the dryer, and
      a valve disposed between the accumulator and the intercooler, the valve structured to enable at least a portion of the coolant in the coolant circuit to flow through the intercooler depending on a temperature of the coolant relative to low and high temperature limits;
   monitoring the coolant temperature;
   actuating the valve when the coolant temperature exceeds the high temperature limit to enable at least a portion of the coolant in the coolant circuit to flow from the accumulator, through the intercooler, and to the pump;

actuating the valve when the coolant temperature is below the low temperature limit to bypass the intercooler and enable coolant to flow from the accumulator to the pump;

as a result of activating the valve when the coolant temperature exceeds the high temperature limit; transferring heat from the coolant to an outlet flow of compressed air from the compressor.

9. The method of claim 8, wherein the valve is a thermostatic valve adapted to activate and deactivate depending on the coolant temperature relative to the prescribed low and high temperature limits.

10. The method of claim 8; wherein the valve is a solenoid actuated by a controller structured to operate upon a change in coolant temperature, wherein the controller is configured to activate and deactivate the solenoid depending on the coolant temperature of to the prescribed low and high temperature limits.

11. The method of claim 8, wherein the coolant temperature is the temperature of the coolant in the accumulator.

12. The method of claim 8, wherein the coolant is water, the compressed gas is air, and the compressor is a contact-cooled rotary screw compressor.

13. The method of claim 8, wherein the compressor is a portion of a gas circuit, the gas circuit further comprising:

another intercooler disposed downstream of and in fluid communication with the compressor and structured to lower a gas temperature of the compressed gas flow and to form a condensate, a second separator disposed downstream of and in fluid communication with the another intercooler and structured to separate the condensate from the compressed gas flow, an integrated dryer disposed downstream of and in fluid communication with the second separator and structured to further lower the temperature of the compressed gas flow and to form additional condensate, wherein the integrated dryer includes the dryer in fluid communication with a first separator, the first separator structured to separate the additional condensate from the compressed gas flow, wherein the integrated dryer is in thermal communication with the intercooler, and a compressed gas outlet disposed downstream of and in fluid communication with the integrated dryer.

14. The method of claim 8, wherein the accumulator includes a temperature sensor in communication with a controller configured to activate and deactivate the valve depending on the coolant temperature relative to upper and lower temperature limits.

15. A gas compression system, the system comprising:

a gas circuit, the gas circuit comprising:

a compressor structured to generate a flow of compressed gas, the compressed gas flow including an entrained coolant therein, a first intercooler disposed downstream of and in fluid communication with the compressor and structured to lower a gas temperature of the compressed gas flow and to form a condensate, wherein the condensate includes at least a portion of the entrained coolant, a first separator disposed downstream of and in fluid communication with the first intercooler and structured to separate the condensate from the compressed gas flow, an integrated dryer disposed downstream of and in fluid communication with the first separator and structured to further lower the temperature of the compressed gas flow and to form additional condensate, wherein the integrated dryer includes a dryer in fluid communication with a second separator, the second separator structured to separate the additional condensate from the compressed gas flow, and in thermal communication with a second intercooler through which the coolant flows, and a compressed gas outlet disposed downstream of and in fluid communication with the integrated dryer; and a coolant circuit, the coolant circuit comprising:

an accumulator structured to accumulate the coolant separated by the first and second separators, the accumulator also structured to receive coolant via a passage that is separate from a passage that conveys the compressed gas flow such that the accumulator is not in compressed gas flow communication with the compressor, the accumulator further structured to supply coolant to the coolant circuit, a pump in fluid communication with the accumulator and the compressor of the gas circuit, the pump structured to introduce the coolant into the compressor, and thereby into the flow of compressed gas, and to circulate the coolant through the coolant circuit, the second intercooler in thermal communication with the dryer of the gas circuit and in fluid communication with the accumulator and the pump, the second intercooler structured to transfer heat from the coolant circuit to the compressed gas flow via the dryer, and a valve disposed between the accumulator and the second intercooler, the valve structured to enable at least a portion of the coolant in the coolant circuit to flow through the second intercooler depending on a temperature of the coolant relative to prescribed low and high temperature limits.

16. The system of claim 15, wherein the valve is a thermostatic valve adapted to activate and deactivate depending on the coolant temperature relative to the prescribed low and high temperature limits.

17. The system of claim 15, wherein the valve is a solenoid actuated by a controller structured to operate upon a change in coolant temperature, wherein the controller is configured to activate and deactivate the solenoid depending on the coolant temperature of to the prescribed low and high temperature limits.

18. The system of claim 15, wherein the coolant temperature is the temperature of the coolant in the accumulator.

19. The system of claim 15, wherein the coolant is water, the compressed gas is air, and the compressor is a contact-cooled rotary screw compressor.

20. The system of claim 15, wherein the valve is activated to enable at least a portion of the coolant in the coolant circuit to flow through the second intercooler when the coolant temperature exceeds the prescribed high temperature limit.

\* \* \* \* \*